(12) United States Patent
Sato

(10) Patent No.: US 10,569,706 B2
(45) Date of Patent: Feb. 25, 2020

(54) OVERHEAD CONSOLE AND VEHICLE-BODY UPPER STRUCTURE

(71) Applicant: TOYOTA JIDOSHA KABUSHIKI KAISHA, Toyota-shi, Aichi-ken (JP)

(72) Inventor: Haruko Sato, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/725,196

(22) Filed: Oct. 4, 2017

(65) Prior Publication Data

US 2018/0118103 A1    May 3, 2018

(30) Foreign Application Priority Data

Nov. 2, 2016    (JP) .................. 2016-215423

(51) Int. Cl.
*B60Q 3/66* (2017.01)
*B60Q 3/54* (2017.01)
(Continued)

(52) U.S. Cl.
CPC ............... *B60Q 3/66* (2017.02); *B60Q 3/51* (2017.02); *B60Q 3/54* (2017.02); *B60Q 3/62* (2017.02);
(Continued)

(58) Field of Classification Search
CPC ... B60Q 3/66; B60Q 3/54; B60Q 3/51; B60Q 3/62; B60Q 3/76; B60Q 3/72; B60Q 2500/10
See application file for complete search history.

(56) References Cited

U.S. PATENT DOCUMENTS 7,438,542 B2 * 10/2008 Baxter, Jr. ............ F04C 14/265
                                                            417/283
8,602,601 B2 * 12/2013 Khazi .................... F21S 8/026
                                                            362/249.02

(Continued)

FOREIGN PATENT DOCUMENTS

DE    102010020796 A1    1/2011
DE    102012108781 A1    3/2014

(Continued)

OTHER PUBLICATIONS

Han MD et al. "Clinical Usefulness of Fresnel Ganzfeld Stimulator". J Korean Opthalmol Soc. 2015, pp. 1874-1979.*

(Continued)

*Primary Examiner* — Thien M Le
*Assistant Examiner* — Asifa Habib
(74) *Attorney, Agent, or Firm* — Oliff PLC

(57) ABSTRACT

An overhead console includes: a light source; and a light guiding member including bending portions at intermediate positions in the light guiding member such that the light guiding member extends from the light incident surface to the light exit surface so as to form an optical path in which light incident on the light incident surface is reflected by reflecting surfaces provided in the bending portions so as to reach the light exit surface, the light guiding member having such a shape that line segments drawn between given points on the light incident surface and given points on the light exit surface do not include a line segment that passes through only the light guiding member.

7 Claims, 10 Drawing Sheets

(51) Int. Cl.
  *B60Q 3/62* (2017.01)
  *B60Q 3/51* (2017.01)
  *B60Q 3/76* (2017.01)
  *B60Q 3/72* (2017.01)

(52) U.S. Cl.
  CPC ............... *B60Q 3/72* (2017.02); *B60Q 3/76* (2017.02); *B60Q 2500/10* (2013.01)

(56) References Cited

U.S. PATENT DOCUMENTS

| | | | | |
|---|---|---|---|---|
| 8,616,723 | B2* | 12/2013 | Zhang | F21K 9/69 362/218 |
| 2002/0015304 | A1 | 2/2002 | Ichikawa et al. | |
| 2005/0141213 | A1 | 6/2005 | Gasquet | |
| 2005/0264716 | A1* | 12/2005 | Kim | H01L 33/54 349/61 |
| 2006/0187659 | A1 | 8/2006 | Nawashiro | |
| 2011/0261570 | A1 | 10/2011 | Okada et al. | |
| 2011/0267823 | A1* | 11/2011 | Angelini | F21L 4/027 362/277 |
| 2015/0092433 | A1* | 4/2015 | Gloss | F21S 41/24 362/511 |

FOREIGN PATENT DOCUMENTS

| | | | |
|---|---|---|---|
| EP | 0847897 | A2 | 6/1998 |
| GB | 2079919 | A * | 1/1982 ............. F21S 43/26 |
| JP | H06-050986 | U | 7/1994 |
| JP | 2001-334868 | A | 12/2001 |
| JP | 2004-273175 | A | 9/2004 |
| JP | 2005-032579 | A | 2/2005 |
| JP | 2005-193892 | A | 7/2005 |
| JP | 2006-123794 | A | 5/2006 |
| JP | 2006-232092 | A | 9/2006 |
| JP | 2006-232185 | A | 9/2006 |
| JP | 2008-007002 | A | 1/2008 |
| JP | 2008-094317 | A | 4/2008 |
| JP | 2009-061848 | A | 3/2009 |
| JP | 2010-132047 | A | 6/2010 |
| JP | 2013-180715 | A | 9/2013 |
| WO | 2005/063527 | A1 | 7/2005 |

OTHER PUBLICATIONS

Mar. 27, 2018 Search Report issued in European Patent Application No. 17196015.6.

* cited by examiner

OVERHEAD CONSOLE AND VEHICLE-BODY UPPER STRUCTURE

INCORPORATION BY REFERENCE

The disclosure of Japanese Patent Application No. 2016-215423 filed on Nov. 2, 2016 including the specification, drawings and abstract is incorporated herein by reference in its entirety.

BACKGROUND

1. Technical Field

The present disclosure relates to an overhead console and a vehicle-body upper structure provided with the overhead console.

2. Description of Related Art

As an overhead console assembled to a ceiling part of a passenger compartment of an automobile, there is an overhead console including a map lamp throwing light on a hand part of an occupant sitting on a front seat. Conventionally, as the overhead console equipped with the map lamp, one described in Japanese Patent Application Publication No. 2010-132047 (JP 2010-132047 A) has been known.

FIG. 16 illustrates a structure of a map lamp of an overhead console described in JP 2010-132047 A. As illustrated in the figure, the overhead console described in JP 2010-132047 A is configured such that a cover 50 constituting a design surface exposed to a passenger compartment has an opening 51 having a funnel-shaped inner surface, a lens 52 is placed in the backmost of the opening 51, and a light source 53 is placed in a deep-side part of the lens 52.

SUMMARY

In the overhead console as described above, the light source 53 of the map lamp is seen from outside through the lens 52, so that bright light generated from the light source 53 gets into the eyes and the occupant might feel dazzling (glare might occur). In order to hide the light source 53 in the overhead console, it is necessary to largely dent the opening 51. In such a case, a deep recess is formed on the design surface of the overhead console, so that its design property decreases.

The present disclosure provides an overhead console and a vehicle-body upper structure each of which is able to restrain an occurrence of glare due to a light source as appropriate.

An overhead console, according to a first aspect of the present disclosure, assembled to a ceiling part of a passenger compartment includes: a light source provided inside the overhead console; and a light guiding member including a light incident surface opposed to a light-emitting surface of the light source, and a light exit surface exposed outside the overhead console, the light guiding member also including bending portions at intermediate positions in the light guiding member such that the light guiding member extends from the light incident surface to the light exit surface so as to form an optical path in which light incident on the light incident surface is reflected by reflecting surfaces provided in the bending portions so as to reach the light exit surface, the light guiding member having such a shape that line segments drawn between given points on the light incident surface and given points on the light exit surface do not include a line segment that passes through only the light guiding member.

In the overhead console, light emitted from the light source enters into the light guiding member from the light incident surface, and passes through the light guiding member so as to be emitted outside from the light exit surface. Light passing through a medium is scattered. Accordingly, if the light of the light source is emitted outside through the light guiding member, a luminous intensity distribution of the light reaching the light exit surface is levelled. That is, a peak of a luminance distribution of the light exit surface during lighting of a map lamp is decreased. Therefore, if the light guiding member having a sufficiently long optical path formed therein from the light incident surface to the light exit surface is provided, it is possible to decrease the peak of the luminance distribution of the light exit surface to such an extent that glare does not occur. However, in a case where the light guiding member has a straight shape without a bending portion, the light guiding member with a length sufficient enough to form a sufficiently long optical path may not be provided inside a flat overhead console.

In this regard, the light guiding member provided in the above overhead console is formed in a shape extending with the bending portions provided at intermediate positions in thereof. Further, the light guiding member has such a shape that line segments that can be drawn between given points on the light incident surface and given points on the light exit surface do not include a line segment that passes through only the light guiding member, that is, a shape in which an optical path that linearly connects the light incident surface to the light exit surface cannot be formed therein-side. In such a light guiding member, the light incident on the light incident surface reaches the light exit surface through a path bending along the shape of the light guiding member. Accordingly, even inside the flat overhead console, the light guiding member having a sufficiently long optical path formed therein from the light incident surface to the light exit surface can be provided. Further, in such a case, even if the light exit surface is not configured such that the light exit surface is hardly visible from outside, an occurrence of glare due to the light source can be restrained. Accordingly, a degree of freedom of appearance design of the overhead console is not spoiled due to anti-glare measures. Accordingly, with the overhead console, it is possible to appropriately restrain the occurrence of glare due to the light source.

In the above aspect, a partition wall made of an opaque material may be provided inside the overhead console so as to intersect with all line segments that do not pass through the light incident surface among the line segments drawn between the given points on the light-emitting surface and the given points on the light exit surface. Even with the above configuration, unevenness in luminance of the light exit surface due to leak light from the light source can be restrained. That is, if the partition wall is provided, the leak light from the light source is blocked by the partition wall, so that the leak light cannot reach the light exit surface directly. Hereby, the emission of the leak light from the light exit surface can be restrained.

In the meantime, the light source emits light so that the light expands radially from the light-emitting surface. When the light incident surface is a flat surface, the light enters into the light guiding member while having such a radial expansion. On that account, most of the light entering into the light guiding member is scattered and lost from the optical path in which the light is reflected only by the reflecting surfaces of the bending portions so as to reach the light exit surface from the light incident surface, which decreases illuminance of a map lamp. In this regard, the light incident surface may be a protruding curved surface. With the above configuration, diffusion of luminous flux incident on the light incident surface, eventually, a decrease of illuminance of the map lamp can be restrained.

Note that it might be difficult that the entire light exit surface is irradiated with light with sufficient brightness by only one light source. Further, it might be difficult to secure necessary illuminance by only one light source. In such a case, a plurality of light sources may be provided for a single light exit surface, and the light guiding member may be configured such that each of the plurality of light sources is individually provided with the light incident surface.

In a map lamp that throws light on a limited range, the directivity of the emission light is strong, and light may be hardly emitted outside an irradiation range of the map lamp during lighting. In such a case, depending on its surrounding brightness, it might be difficult to check whether the map lamp is turned on or off when the light exit surface is viewed from outside the irradiation range of the map lamp. In this regard, the light exit surface may be constituted by a flat portion constituted by a flat surface perpendicular to a front-face direction of the light exit surface, and a cut face portion constituted by a surface inclined to the flat portion so as to divide the flat portion into a plurality of regions. In such a case, while the light is emitted within the irradiation range of the map lamp through the flat portion, the light can be also emitted in directions other than the irradiation range of the map lamp through the cut face portion, thereby making it possible to easily check whether the map lamp is turned on or not.

A vehicle-body upper structure, according to a second aspect of the present disclosure, constituting a roof portion of a vehicle body, includes an overhead console including a light source provided inside the overhead console and assembled to a ceiling part of a passenger compartment. The overhead console includes a light guiding member including a light incident surface opposed to a light-emitting surface of the light source, and a light exit surface exposed outside the overhead console, the light guiding member also including bending portions at intermediate positions in the light guiding member such that the light guiding member extends from the light incident surface to the light exit surface so as to form an optical path in which light incident on the light incident surface is reflected by reflecting surfaces provided in the bending portions so as to reach the light exit surface, the light guiding member having such a shape that line segments drawn between given points on the light incident surface and given points on the light exit surface do not include a line segment that passes through only the light guiding member. The light exit surface is positioned on a vehicle-body front side relative to a position of a back rest of a front seat of a vehicle. The light source is positioned on a vehicle-body rear side relative to the light exit surface.

In the overhead console including the light guiding member configured as described above, light emitted from the light source is emitted outside through a path bending in the light guiding member. Accordingly, the light guiding member having a sufficiently long optical path formed therein from the light incident surface to the light exit surface can be provided inside the flat overhead console, so that a luminance distribution of the light exit surface exposed outside can be levelled by scattering of the light in the light guiding member. Accordingly, when an occupant looks at the light exit surface, the occupant feels less dazzling.

In the meantime, if leak light from the light source, which is not incident on the light incident surface of the light guiding member, reaches the eyes of the occupant through the light exit surface, unevenness might be caused in the luminance of the light exit surface when viewed from the occupant. In this regard, in the vehicle-body upper structure, in a state where the vehicle-body upper structure is assembled to a vehicle body, the light exit surface is positioned on the vehicle-body front side relative to the position of the back rest of the front seat of the vehicle, and the light source is positioned further on the vehicle-body rear side relative to the light exit surface. In such a case, a direction of the leak light to be emitted to the passenger compartment through the light exit surface from the light source is a direction opposite to a direction where the occupant sitting on the front seat is positioned, when viewed from the light exit surface. Accordingly, when the occupant sitting on the front seat looks at the light exit surface, no unevenness occurs in the luminance of the light exit surface due to the leak light from the light source.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following description describes one embodiment of an overhead console and a vehicle-body upper structure in detail with reference to FIGS. 1 to 14. Note that, in each figure to be referred to in the following description, in the vehicle-body upper structure or the overhead console assembled to the vehicle-body upper structure, a direction toward a vehicle-body front side is indicated by an arrow FW, a direction toward a vehicle-body rear side is indicated by an arrow RR, a direction toward a vehicle-body left side is indicated by an arrow LH, a direction toward a vehicle-body right side is indicated by an arrow RH, a direction toward a vehicle-body upper side is indicated by an arrow UP, and a direction toward a vehicle-body lower side is indicated by an arrow DW. Further, in the following description, in a state where the overhead console is assembled to the vehicle-body upper structure, the vehicle-body front side, the vehicle-body rear side, the vehicle-body left side, the vehicle-body right side, the vehicle-body upper side, and the vehicle-body lower side are referred to as a front side, a rear side, a left side, a right side, an upper side, and a lower side of the overhead console, respectively.

Figure 1:
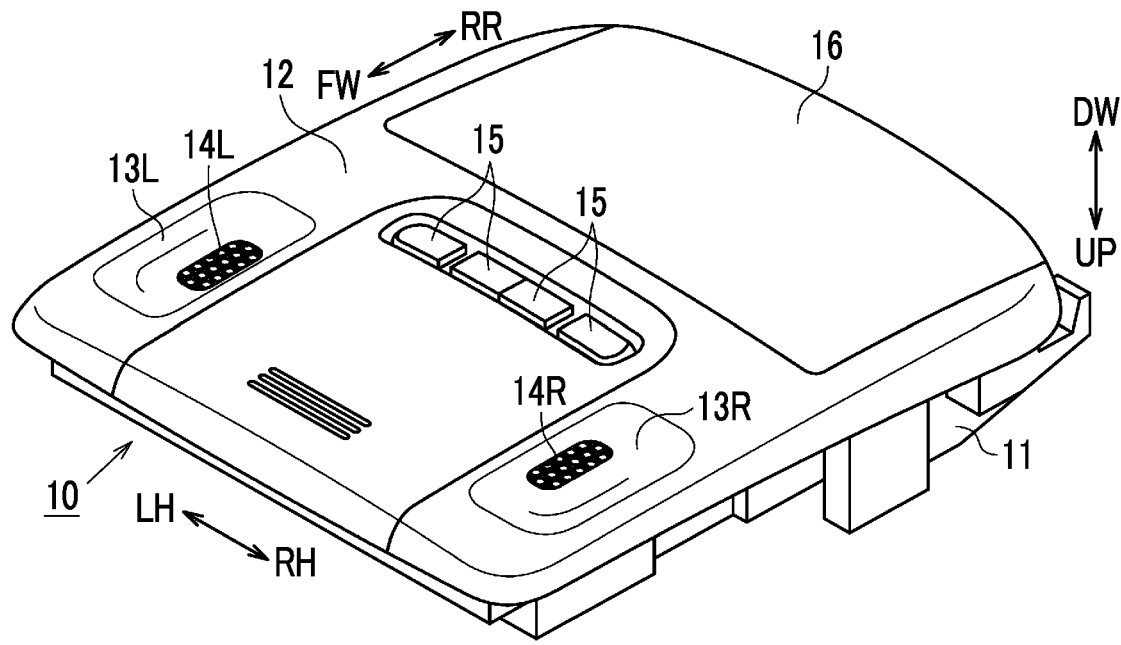
FIG. 1 is a perspective view of one embodiment of an overhead console.

As illustrated in FIG. 1, a housing of an overhead console 10 is constituted by a base portion 11 fixed to a ceiling part of a vehicle body at the time when the housing is assembled to the vehicle-body upper structure constituting a roof portion of a vehicle body, and a cover 12 attached to a lower side of the base portion 11. The cover 12 constitutes a design surface facing a passenger compartment in the overhead console 10. Note that, in the present embodiment, the base portion 11 and the cover 12 are made of a resin material having a similar color to the ceiling part of the passenger compartment.

Figure 2:
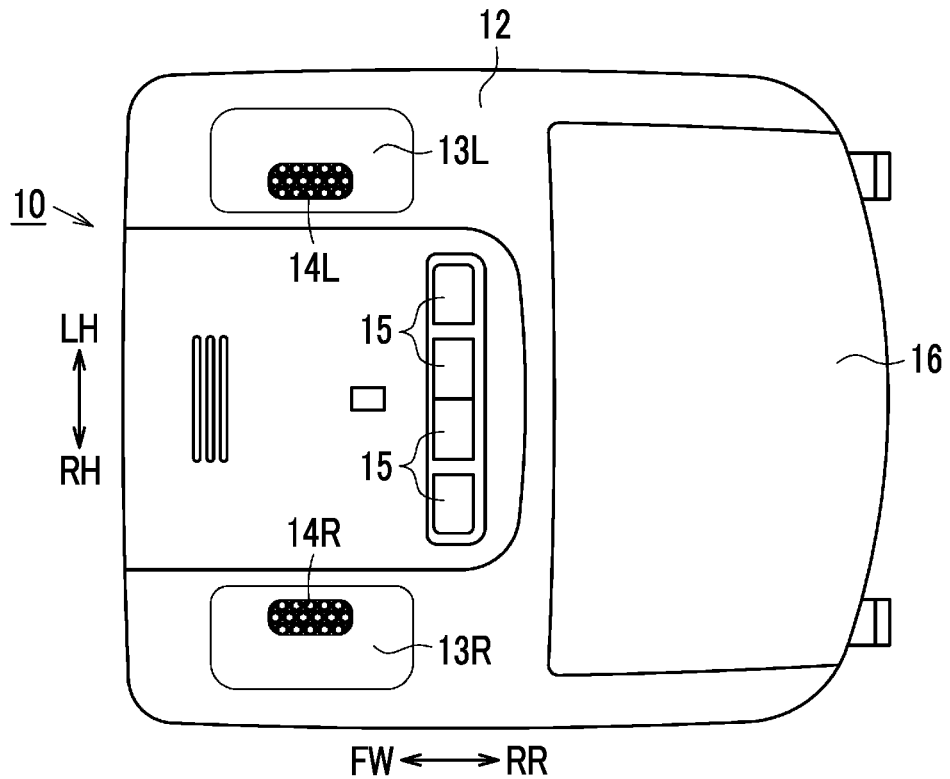
FIG. 2 is a plan view of the overhead console.

As illustrated in FIGS. 1 and 2, left and right parts of a front portion of the cover 12 are provided with respective recessed portions 13L, 13R that are slightly hollowed. The left recessed portion 13L has an opening 14L serving as a light emission opening of a left map lamp that throws light on a hand part of an occupant sitting on a left-front seat, and the right recessed portion 13R has an opening 14R serving as a light emission opening of a right map lamp that throws light on a hand part of an occupant sitting on a right-front seat. The opening 14L, 14R has a generally elliptical shape. Note that switches 15 such as operation switches of the map lamps and a glass case 16 in which sunglasses and the like are accommodated are attached to the cover 12.

Figure 3A:
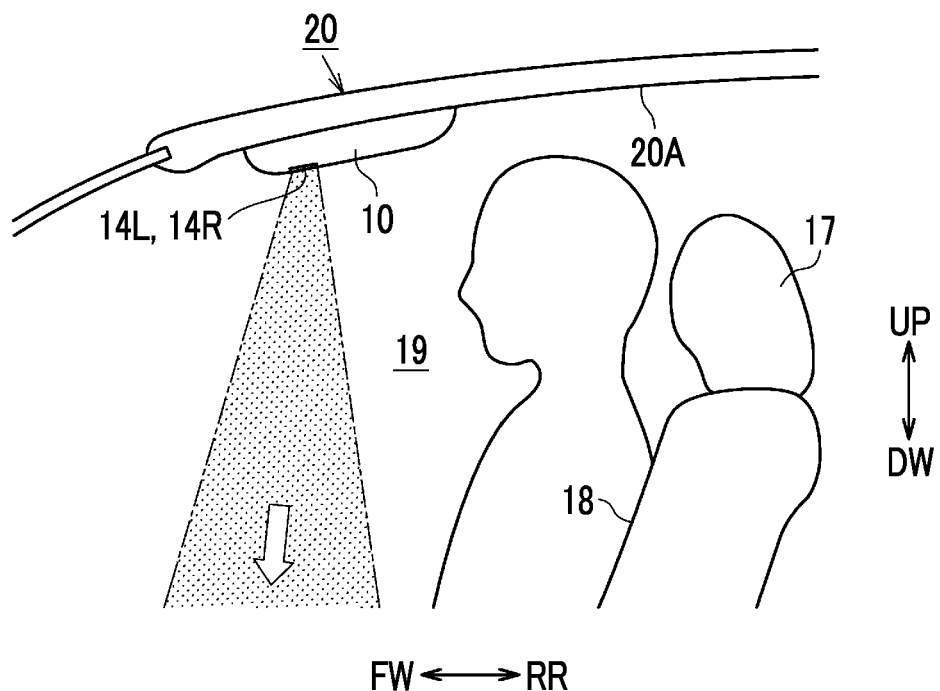
FIG. 3A is a schematic drawing illustrating an assembling position of the overhead console in a passenger compartment when one embodiment of a vehicle-body upper structure is viewed from a vehicle-body lateral side.
Figure 3B:
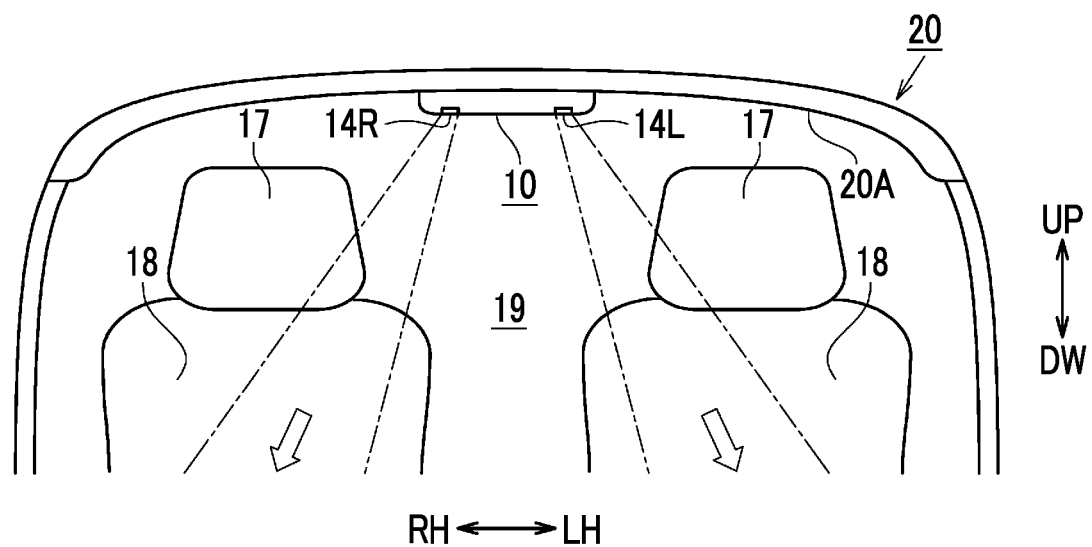
FIG. 3B is a schematic drawing illustrating an assembling position of the overhead console in the passenger compartment when the vehicle-body upper structure is viewed from a vehicle-body front side.

FIGS. 3A, 3B illustrate an assembling position of the overhead console 10 in the vehicle-body upper structure 20. The overhead console 10 is assembled to a passenger-compartment-19-side part of the vehicle-body upper structure 20, that is, to a ceiling part 20A of the passenger compartment 19.

As illustrated in FIG. 3A, in the vehicle-body upper structure 20, the overhead console 10 is assembled to the ceiling part 20A of the passenger compartment 19 so as to be positioned on a vehicle-body front side relative to a position of a back rest 18 of a front seat 17 of the vehicle. The left and right openings 14L, 14R provided in the cover 12 of the overhead console 10 are positioned on the vehicle-body front side relative to a head of an occupant sitting on the front seat 17, at the time of assembling of the vehicle body.

Further, as illustrated in FIG. 3B, the overhead console 10 in the vehicle-body upper structure 20 is assembled to a central part, in a vehicle width direction, of the ceiling part 20A of the passenger compartment 19. Light is emitted from the left opening 14L to the hand part of the occupant sitting on the left front seat 17, and light is emitted from the right opening 14R to the hand part of the occupant sitting on the right front seat 17.

Next will be described a structure of the map lamp provided in the overhead console 10. Note that the following describes a structure of the left map lamp, but the right map lamp also has the same structure except that shapes of component parts are bilaterally symmetric to the left map lamp.

Figure 4:
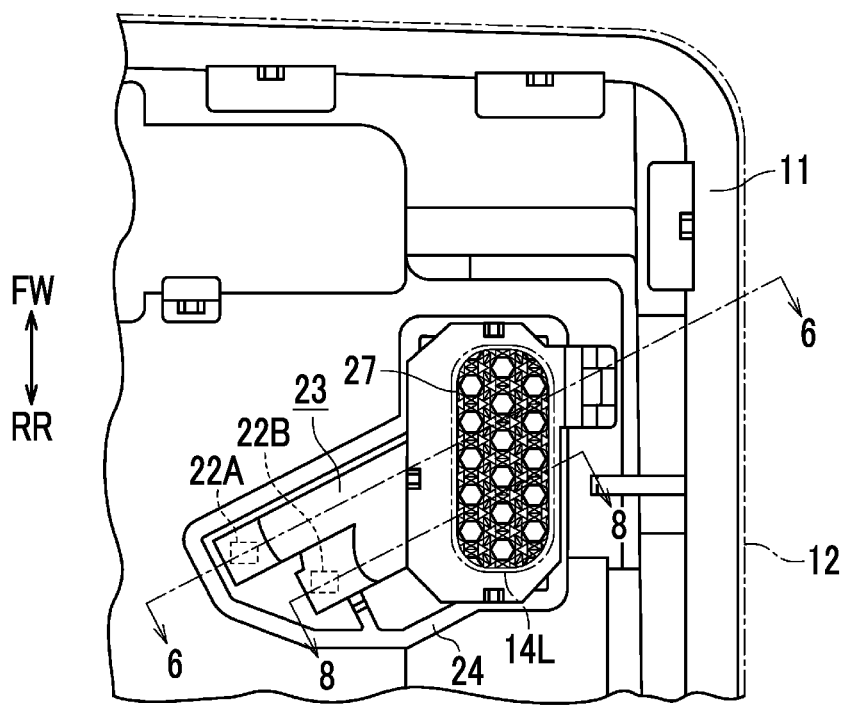
FIG. 4 is a plan view around a mounting part of a light source and a light guiding member of a map lamp in the overhead console in a state where a cover is removed.

FIG. 4 illustrates an internal structure of a left front part of the overhead console 10 in a state where the cover 12 is removed. That is, a part illustrated in the figure is a part positioned around the left opening 14L in a state where the cover 12 is attached.

As illustrated in the figure, two light sources 22A, 22B for the left map lamp are placed side by side inside the overhead console 10 at a position on a right rear side of the overhead console 10 relative to a position of the opening 14L. The overhead console 10 employs a surface-mounting light-emitting diode as those light sources 22A, 22B. Further, the overhead console 10 is provided with a light guiding member 23 that guides, to the opening 14L, light emitted from the light sources 22A, 22B.

Note that a shielding member 24 surrounding the light guiding member 23 is attached to the base portion 11 of the overhead console 10. The shielding member 24 is made of a resin material having the same color as the base portion 11 and the cover 12.

Figure 5:
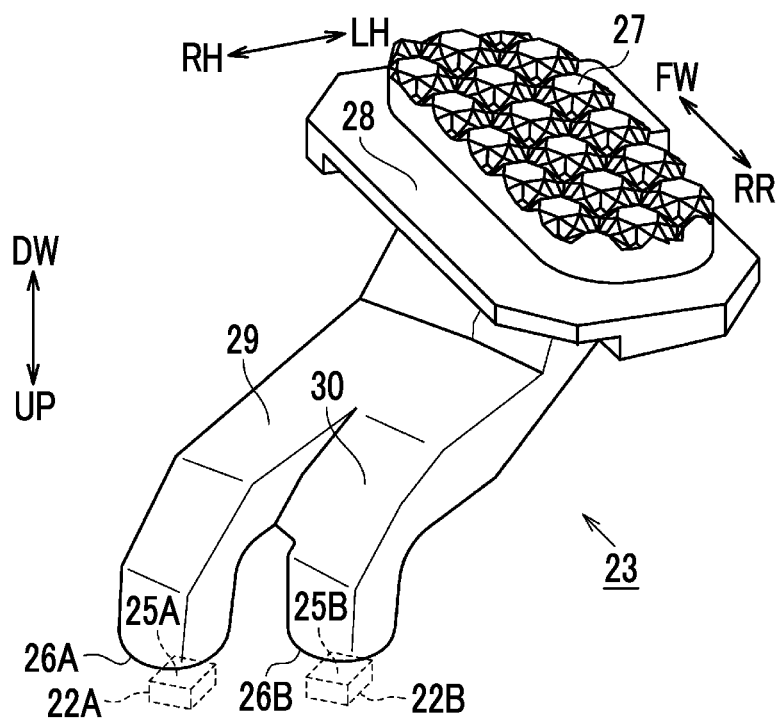
FIG. 5 is a perspective view of the light guiding member, which is a component part of the map lamp in the overhead console.

As illustrated in FIG. 5, the light guiding member 23 is a member having a shape in which a part on the lower side (a side facing the vehicle-body upper side at the time of assembly of the vehicle body) in the figure is branched into two, and is made of a transparent resin material. Two branched ends of the light guiding member 23 on the lower side in the figure serve as light incident surfaces 26A, 26B opposed to light-emitting surfaces 25A, 25B of the two light sources 22A, 22B. The light incident surfaces 26A, 26B are formed into protruding curved surfaces. Further, an end of the light guiding member 23 on the upper side (a side facing the vehicle-body lower side at the time of assembling of the vehicle body) in the figure serves as a light exit surface 27 exposed outside the overhead console 10 through the opening 14L of the cover 12. Note that a plate-shaped flange portion 28 projecting outward in a circumferential direction is provided in a part of the light guiding member 23 around the light exit surface 27.

Figure 6:
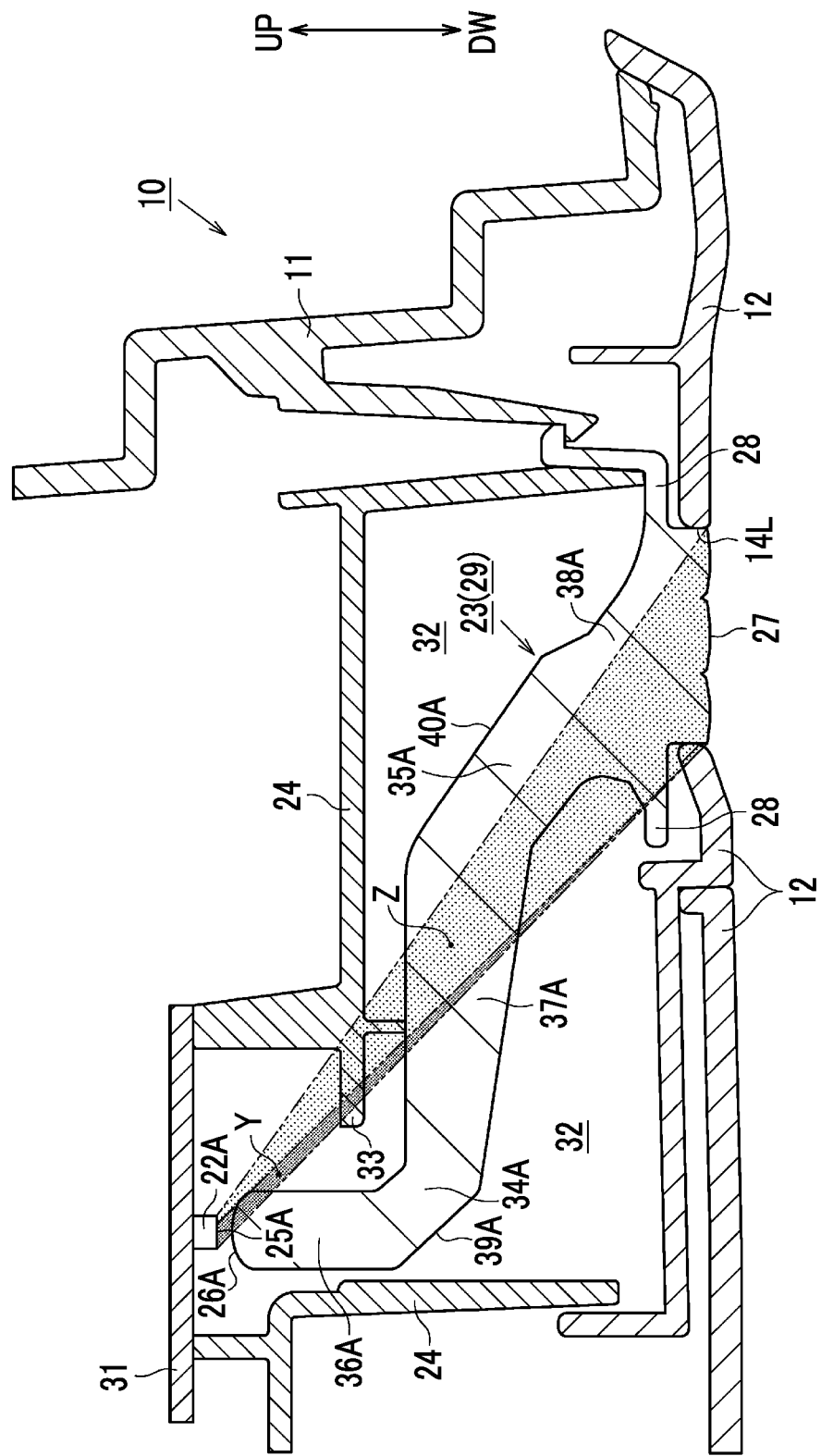
FIG. 6 is a sectional view of the overhead console along a line 6-6 in FIG. 4.

As illustrated in FIG. 6, the light guiding member 23 is attached to the overhead console 10 in a state where the flange portion 28 is sandwiched between the shielding member 24 and each of the base portion 11 and the cover 12. Note that the light exit surface 27 has a generally elliptical shape similar to the opening 14L, and when the light guiding member 23 is attached to the overhead console 10, the light exit surface 27 closes the opening 14L so as to be generally flush with a part around the opening 14L on a design surface of the cover 12.

Further, the two light sources 22A, 22B (only the light source 22A is illustrated in FIG. 6) are provided on a circuit substrate 31 attached to the base portion 11. The circuit substrate 31 is made of a black resin material having a high light blocking effect.

Further, the light guiding member 23 is placed, together with the light sources 22A, 22B, inside an accommodation chamber 32 sectioned by the cover 12, the shielding member 24, and the circuit substrate 31 inside the overhead console 10 and isolated from other parts inside the overhead console 10. This restrains light of the light sources 22A, 22B from leaking out from parts except for the opening 14L (14R) into the passenger compartment 19.

Further, a partition wall 33 projecting into the accommodation chamber 32 is provided in a part, in the shielding member 24, closer to the light incident surfaces 26A, 26B (only the light incident surface 26A is illustrated in FIG. 6) of the light guiding member 23. As will be described later, the partition wall 33 blocks leak light from the light sources 22A, 22B so as not to be incident on the light exit surface 27.

In the above aspect, the light guiding member 23 attached to the overhead console 10 forms therein an optical path through which light incident on the light incident surface 26A from the light source 22A reaches a vehicle-body front part of the light exit surface 27, and an optical path through which light incident on the light incident surface 26B from the light source 22B reaches a vehicle-body rear part of the light exit surface 27.

Figure 7:
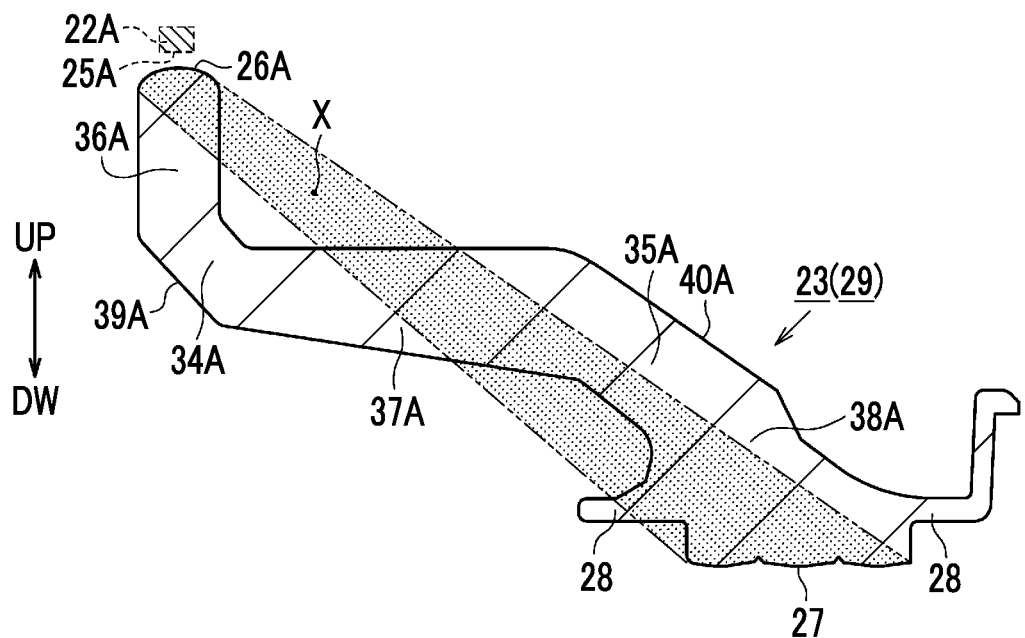
FIG. 7 is a sectional view of the light guiding member along the line 6-6 in FIG. 4.

FIG. 7 illustrates a sectional structure of the light guiding member 23 along a line 6-6 in FIG. 4. In the light guiding member 23, a part where a section illustrated in the figure is placed is a part (hereinafter referred to as a first light guiding portion 29) where the optical path through which the light incident on the light incident surface 26A from the light source 22A reaches the vehicle-body front part of the light exit surface 27 is formed.

As illustrated in the figure, the first light guiding portion 29 is provided with two bending portions, i.e., a first bending portion 34A, and a second bending portion 35A bending in a direction opposite to the first bending portion 34A. Further, the first light guiding portion 29 is provided with a light incident portion 36A from the light incident surface 26A to the first bending portion 34A, an intermediate linear portion 37A linearly extending from the first bending portion 34A to the second bending portion 35A, and a light emission portion 38A from the second bending portion 35A to the light exit surface 27. Note that the light incident portion 36A, the intermediate linear portion 37A, and the light emission portion 38A are formed thicker from the light incident surface 26A toward the light exit surface 27. The first light guiding portion 29 of the light guiding member 23 has a shape in which two bending portions (34A, 35A) are provided at intermediate positions in thereof so as to extend from the light incident surface 26A toward the light exit surface 27.

Further, the first bending portion 34A is provided with a first reflecting surface 39A that reflects light reaching the first bending portion 34A through the light incident portion 36A to an extending direction of the intermediate linear portion 37A. Further, the second bending portion 35A is provided with a second reflecting surface 40A that reflects light reaching the second bending portion 35A through the intermediate linear portion 37A toward the light exit surface 27.

Note that the first light guiding portion 29 of the light guiding member 23 has a shape with no optical path that linearly connects the light incident surface 26A to the light exit surface 27 as an optical path through which light travels from the light incident surface 26A to the light exit surface 27. Here, in the section illustrated in FIG. 7, when line segments that can be drawn between given points on the light incident surface 26A and given points on the light exit surface 27 are all described, a range X illustrated by hatching in the figure is filled therewith. As is apparent from such a drawing, there is no optical path that linearly reaches the light exit surface 27 from the light incident surface 26A only through the light guiding member 23, on the section illustrated in FIG. 7. Therefore, if this can be said about all sections passing through both the light incident surface 26A and the light exit surface 27, there is no optical path that linearly reaches the light exit surface 27 from the light incident surface 26A only through the light guiding member 23. That is, the first light guiding portion 29 has such a shape that the line segments that can be drawn between given points on the light incident surface 26A and given points on the light exit surface 27 do not include a line segment that passes through only the light guiding member 23.

Figure 8:
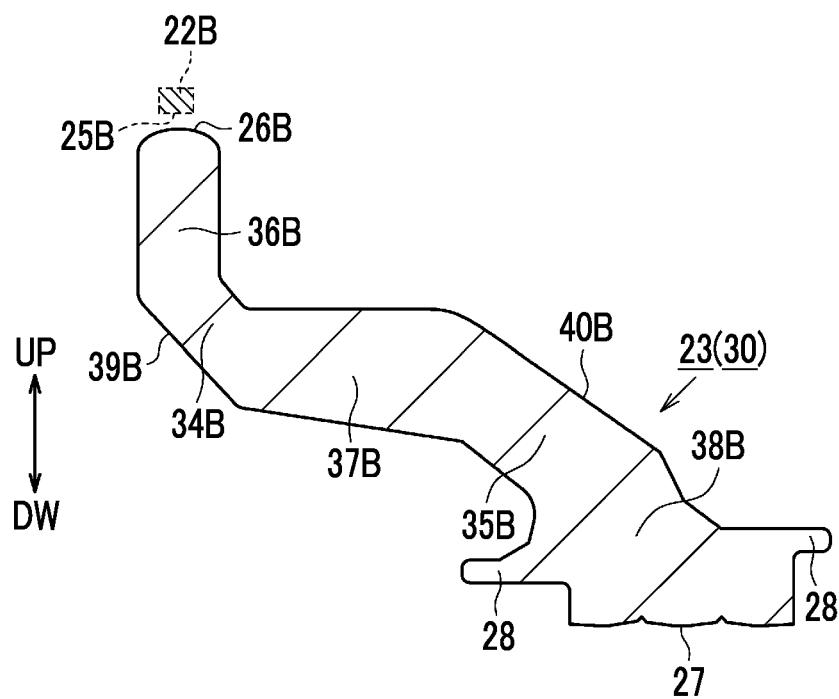
FIG. 8 is a sectional view of the light guiding member along a line 8-8 in FIG. 4.

FIG. 8 illustrates a sectional structure of the light guiding member 23 along a line 8-8 in FIG. 4. In the light guiding member 23, a part where a section illustrated in the figure is placed is a part (hereinafter referred to as a second light guiding portion 30) where an optical path through which light incident on the light incident surface 26B from the light source 22B reaches the vehicle-body rear part of the light exit surface 27 is formed.

Similarly to the first light guiding portion 29, the second light guiding portion 30 includes two bending portions (i.e., a first bending portion 34B and a second bending portion 35B), a light incident portion 36B, an intermediate linear portion 37B, a light emission portion 38B, and two reflecting surfaces (i.e., a first reflecting surface 39B and a second reflecting surface 40B). Each part is configured in generally the same manner as the first light guiding portion 29 except that a length of the intermediate linear portion 37B is shorter than the intermediate linear portion 37A of the first light guiding portion 29. That is, similarly to the first light guiding portion 29, the second light guiding portion 30 has a shape in which two bending portions (34B, 35B) are provided at intermediate positions in thereof so as to extend from the light incident surface 26B to the light exit surface 27. Further, similarly to the first light guiding portion 29, the second light guiding portion 30 also has such a shape that line segments that can be drawn between given points on the light incident surface 26B and given points on the light exit surface 27 do not include a line segment that passes through only the light guiding member 23.

Incidentally, in the light guiding member 23, the first light guiding portion 29 and the second light guiding portion 30 are not completely separated from each other, but are connected to each other at the intermediate linear portions 37A, 37B, the second bending portions 35A, 35B, and the light emission portions 38A, 38B (see FIG. 5). Hereby, strength and moldability of the light guiding member 23 are secured.

Figure 9:
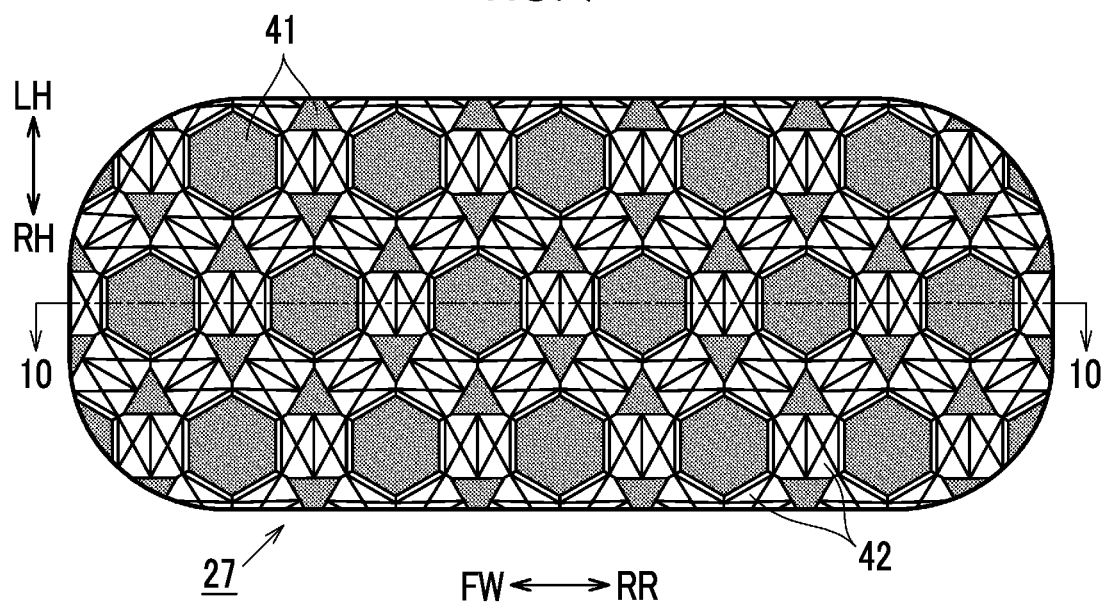
FIG. 9 is a plan view of a light exit surface of the light guiding member.
Figure 10:
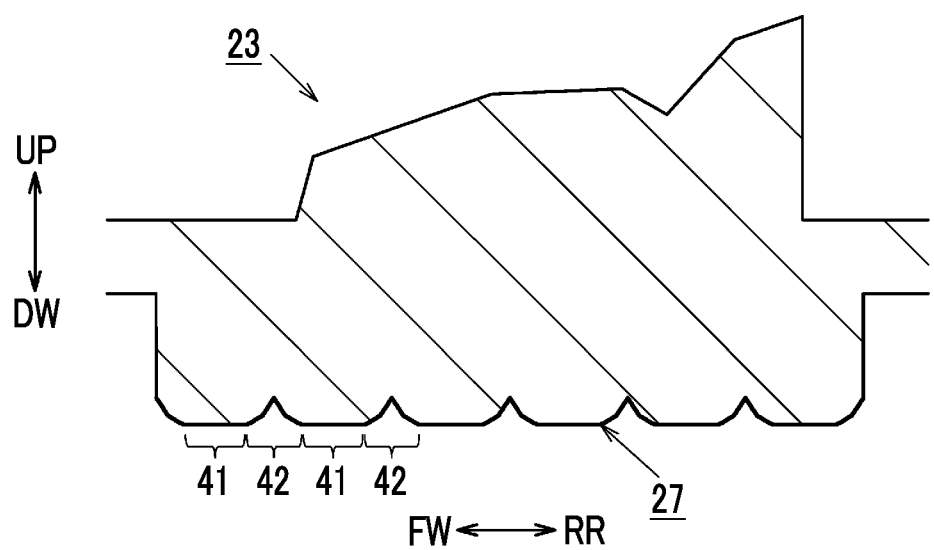
FIG. 10 is a sectional view along a line 10-10 in FIG. 9.

FIG. 9 illustrates a plane structure of the light exit surface 27 of the light guiding member 23, and FIG. 10 illustrates a sectional structure of the light guiding member 23 along a line 10-10 in FIG. 9. As illustrated in the figures, the light exit surface 27 is constituted by a flat portion 41 constituted by a flat surface perpendicular to a front-face direction of the light exit surface 27, and a cut face portion 42 constituted by a surface inclined to the flat portion 41 so as to divide the flat portion 41 into a plurality of regions. The front-face direction of the light exit surface 27 here indicates a direction where a vertical line extends from the light exit surface 27 when the light exit surface 27 is assumed a flat surface. In a state where the overhead console 10 of the present embodiment is assembled to the vehicle body, the vehicle-body lower side is the front-face direction of the light exit surface 27.

Note that, as illustrated in the figure, in the overhead console 10, the flat portion 41 is constituted by many hexagonal or triangular planes provided so as to be distanced from each other with the cut face portion 42 being sandwiched therebetween. Further, the cut face portion 42 is constituted by planes of a plurality of types having different shapes and different inclination angles relative to the flat portion 41. Note that parts constituting the flat portion 41 in the light exit surface 27 are illustrated by hatching in FIG. 9.

(Effects) Next will be described operations and effects of the overhead console 10 and the vehicle-body upper structure 20 of the present embodiment configured as described above.

As described above, the overhead console 10 includes right and left map lamps each provided with two light sources 22A, 22B. The light emitted from the light source 22A, 22B passes through the light guiding member 23 and reaches the light exit surface 27 of the light guiding member 23 provided in the opening 14L, 14R of the cover 12, and then, the light is emitted from the light exit surface 27 into the passenger compartment 19. At this time, the light of the light source 22A passes through the first light guiding portion 29 of the light guiding member 23 and reaches the vehicle-body front part of the light exit surface 27, and the light of the light source 22B passes through the second light guiding portion 30 of the light guiding member 23 and reaches the vehicle-body rear part of the light exit surface 27.

Figure 11:
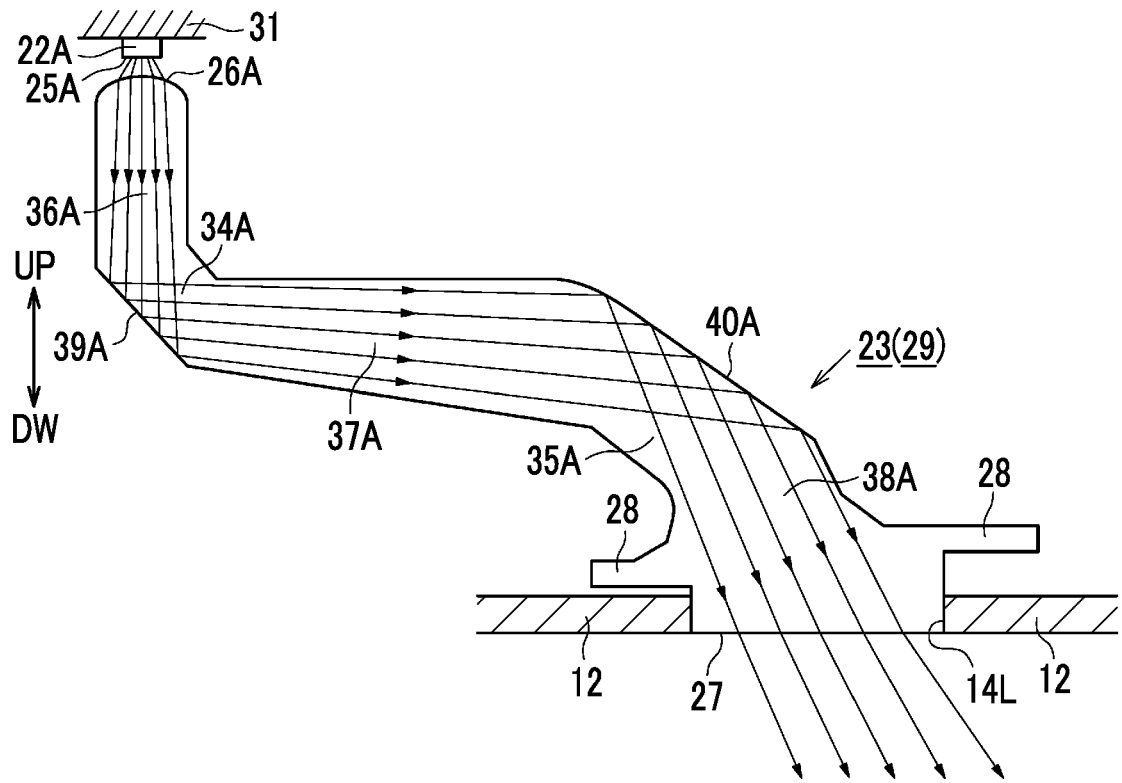
FIG. 11 is a view illustrating progression of light in the light guiding member.

FIG. 11 illustrates progression of light from the light source 22A in the first light guiding portion 29 of the light guiding member 23 to the passenger compartment 19. Light emitted from the light-emitting surface 25A of the light source 22A enters into the light guiding member 23 from the light incident surface 26A. The light thus entering from the light incident surface 26A travels through the light incident portion 36A and reaches the first bending portion 34A. The light is then reflected by the first reflecting surface 39A provided in the first bending portion 34A to the extending direction of the intermediate linear portion 37A. The light thus reflected by the first reflecting surface 39A travels through the intermediate linear portion 37A and reaches the second bending portion 35A. The light is then reflected by the second reflecting surface 40A provided in the second bending portion 35A toward the light exit surface 27. The light thus reflected by the second reflecting surface 40A travels through the light emission portion 38A and reaches the light exit surface 27, and the light is emitted from the light exit surface 27 into the passenger compartment 19.

Light of the other light source 22B also enters into the light guiding member 23 from the light incident surface 26B and passes through the second light guiding portion 30 having two bending portions, i.e., the first bending portion 34B and the second bending portion 35B. Then, the light is reflected twice, i.e., reflected by the first reflecting surface 39B and the second reflecting surface 40B and reaches the light exit surface 27. Hereby, the light is emitted from the light exit surface 27 into the passenger compartment 19.

Further, as described above, in the overhead console 10, the opening 14L, 14R serving as the light emission opening of the map lamp has a generally elliptical shape, and the light exit surface 27 placed in the opening 14L, 14R also has a generally elliptical shape. Accordingly, only a single light source cannot send light to the entire light exit surface 27, which easily causes unevenness in luminance of the light exit surface 27. In this regard, the overhead console 10 of the present embodiment is provided with two light sources 22A, 22B for a single light exit surface 27. The light guiding member 23 is provided with respective light incident surfaces 26A, 26B and respective light guiding portions (the first light guiding portion 29, the second light guiding portion 30) for the two light sources 22A, 22B, individually. Accordingly, it is possible to more equally send light to the entire light exit surface 27 having a generally elliptical shape, which eventually allows an entire irradiation part of the map lamp to be irradiated with the light with more equal brightness.

The overhead console 10 employs, as the light source 22A, 22B of the map lamp, a surface-mounting light-emitting diode in which the light-emitting surface 25A, 25B has a small surface and the light-emitting surface 25A, 25B has a high luminance. On this account, when an occupant directly looks at the light of the light source 22A, 22B, the occupant might feel dazzling. In this regard, in the overhead console 10 of the present embodiment, the light of the light source 22A, 22B passes through the light guiding member 23, and then, the light is emitted into the passenger compartment 19. The light at this time is scattered gradually while passing through the light guiding member 23. On this account, if the light guiding member 23 is sufficiently long, a luminous intensity distribution of the light that reaches the light exit surface 27 is levelled, so that a peak of a luminance distribution of the light exit surface 27 at the time when the occupant looks at the light exit surface 27 can be decreased to such an extent that glare does not occur.

Figure 12:
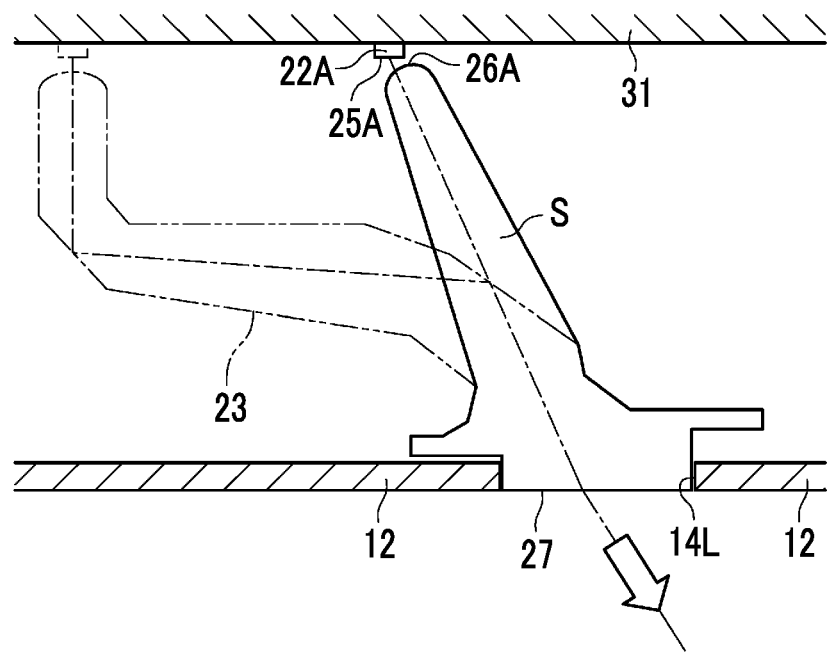
FIG. 12 is a view illustrating a sectional structure of a light guiding member that does not have a bending portion, in comparison with a sectional structure of the light guiding member provided in the overhead console of the embodiment.

Here, assume a case where a light guiding member S having a straight shape without any bending portion as illustrated in FIG. 12 is employed. Since the overhead console 10 has a flat shape, a mounting space for the light guiding member inside the overhead console 10 is limited. On that account, in a case where the light guiding member has a straight shape, a length of the light guiding member placeable inside the overhead console 10 is limited, which may not be able to scatter light sufficiently until the light reaches the light exit surface 27.

In this regard, the light guiding member 23 provided in the overhead console 10 has a shape bending in a crank shape and causes the light of the light source 22A, 22B to reach the light exit surface 27 through a path bending along the shape thus bending. Accordingly, even in the overhead console 10 having a flat shape, it is possible to provide the light guiding member 23 having a sufficiently long optical path from the light incident surface 26A, 26B to the light exit surface 27. Further, in such a case, even if the light exit surface 27 that emits light into the passenger compartment 19 is seen from outside, it is possible to restrain the occurrence of glare due to the light of the light source 22A, 22B. Accordingly, a degree of freedom of appearance design of the overhead console 10 is not spoiled by anti-glare measures to deeply hollow a part where the light exit surface 27 is provided, or the like measures. Accordingly, with the present embodiment, it is possible to appropriately restrain the occurrence of glare due to the light sources 22A, 22B of the map lamp.

Further, in a state where the overhead console 10 is assembled to the vehicle-body upper structure 20, the first light guiding portion 29 and the second light guiding portion 30 of the light guiding member 23 are extended to a vehicle-body diagonally front side from the light incident surfaces 26A, 26B toward the light exit surface 27, so that a light irradiation direction from the light exit surface 27 into the passenger compartment 19 is also the vehicle-body diagonally front side. In the meantime, the light exit surface 27 is placed on the vehicle-body front side relative to the position of the back rest 18 of the front seat 17 of the vehicle, eventually, on the vehicle-body front side relative to the head of the occupant sitting on the front seat 17. Accordingly, a light emission direction from the light exit surface 27 into the passenger compartment 19 is a direction opposite to a direction where the occupant sitting on the front seat 17 is positioned, when viewed from the light exit surface 27, so that the light emitted from the light exit surface 27 can hardly enter the eyes of the occupant. This also restrains the occurrence of glare.

In the meantime, if leak light of the light source 22A, 22B, which is not incident on the light incident surface 26A, 26B of the light guiding member 23, reaches the eyes of the occupant through the light exit surface 27, unevenness might be caused in the luminance of the light exit surface 27 when viewed from the occupant.

In this regard, in the overhead console 10, one (22B) of the two light sources 22A, 22B is positioned on the vehicle-body rear side relative to the light exit surface 27. Accordingly, a direction of leak light to be emitted to the passenger compartment 19 through the light exit surface 27 from the light source 22B is a direction opposite to a direction where the occupant sitting on the front seat 17 is positioned, when viewed from the light exit surface 27. Accordingly, when the occupant sitting on the front seat 17 looks at the light exit surface 27, no unevenness occurs in the luminance of the light exit surface 27 due to at least the leak light of the light source 22B. Further, the other light source 22A is also provided at a position slightly on the vehicle-body front side relative to the light source 22B, and leak light from the light source 22A is also hardly emitted in the direction where the occupant sitting on the front seat 17 is positioned, when viewed from the light exit surface 27. Accordingly, when the occupant sitting on the front seat 17 looks at the light exit surface 27, unevenness hardly occurs in the luminance of the light exit surface 27 due to the leak light of the light source 22A, 22B.

Further, in the overhead console 10, since the partition wall 33 is configured as follows, the unevenness in the luminance of the light exit surface 27 due to the light source 22A, 22B is restrained.

In the section illustrated in FIG. 6, if any object that blocks, reflects, or refracts light is not provided between the light-emitting surface 25A of the light source 22A and the light exit surface 27, the light of the light source 22A reaches the light exit surface 27 straight from the light-emitting surface 25A. That is, the light of the light source 22A at this time reaches the light exit surface 27 through any of line segments that can be drawn between given points on the light-emitting surface 25A of the light source 22A and given points on the light exit surface 27 in the above section.

Here, in the section, when line segments that can be drawn between given points on the light-emitting surface 25A and given points on the light exit surface 27 are all drawn, a range Y and a range Z illustrated by hatching in the figure are filled therewith.

Further, in the section, when only line segments that do not pass through the light incident surface 26A are drawn selected from among the line segments that can be drawn between given points on the light-emitting surface 25A and given points on the light exit surface 27, the range Z is filled therewith. Accordingly, in the section, if a partition wall that blocks light is provided so as to halve the range Z in a part between the light-emitting surface 25A and the light exit surface 27, the leak light of the light source 22A to reach the light exit surface 27 can be blocked. Further, if a partition wall that blocks light is provided so as to halve a range corresponding to the range Z in all sections that pass through either of the light-emitting surfaces 25A, 25B of the light sources 22A, 22B and the light exit surface 27, it is possible to block all the leak light of the light sources 22A, 22B to directly reach the light exit surface 27 without passing through the light guiding member 23.

In this regard, in the overhead console 10, the partition wall 33 is provided so as to intersect with all line segments that do not pass through the light incident surfaces 26A, 26B among the line segments that can be drawn between given points on the light-emitting surfaces 25A, 25B of the light sources 22A, 22B and given points on the light exit surface 27. Such a partition wall 33 is provided in the shielding member 24 made of a resin material of a similar color to the ceiling part 20A of the passenger compartment 19, that is, an opaque resin material. Accordingly, by providing the partition wall 33 in the above manner, it is possible to effectively block the leak light of the light sources 22A, 22B to reach the light exit surface 27 without passing through the light guiding member 23.

Figure 13A:
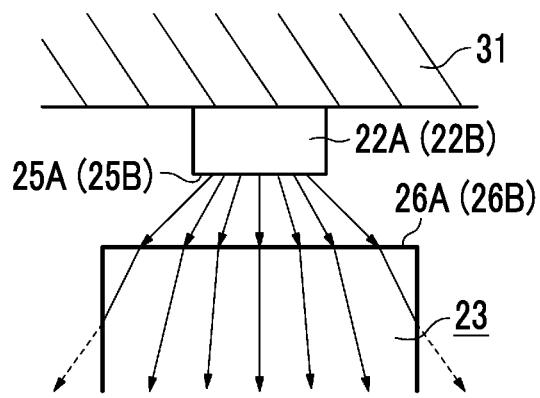
FIG. 13A is a view illustrating a light incident mode from the light source to the light guiding member in a case where a light incident surface is a flat surface.

In the meantime, the light source 22A, 22B emits light so that the light expands radially from the light-emitting surface 25A, 25B. Accordingly, as illustrated in FIG. 13A, when the light incident surface 26A (26B) is a flat surface, the light enters into the light guiding member 23 with such a radial expansion. In such a case, most light incident on the light incident surface 26A (26B) and traveling through the light incident portion 36A (36B) is directed in directions other than an extending direction of the light incident portion 36A (36B), and deviates from the optical path through which the light reaches the light exit surface 27 only by being reflected by the first reflecting surface 39A (39B) and the second reflecting surface 40A (40B). On that account, most light emitted from the light source 22A, 22B is scattered and lost before the light reaches the light exit surface 27, so that the illuminance of the map lamp decreases.

Figure 13B:
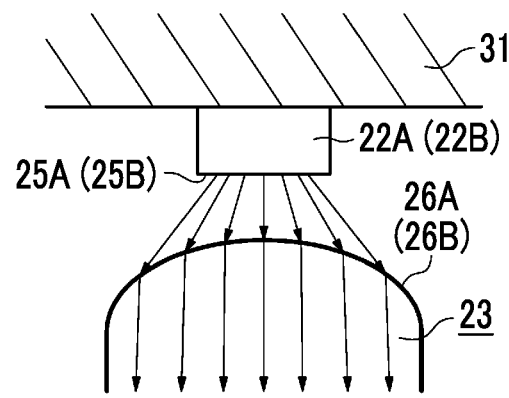
FIG. 13B is a view illustrating a light incident mode from the light source to the light guiding member in a case where the light incident surface is a protruding curved surface.

In this regard, in the overhead console 10, the light incident surface 26A (26B) is formed into a protruding curved surface as illustrated in FIG. 13B. In such a case, an entry angle of light to the light incident surface 26A (26B) becomes shallower toward a side closer to an end of the light incident surface 26A (26B), so that deflection of the light at the light incident surface 26A (26B) becomes larger. Accordingly, the expansion of the light entering into the light guiding member 23 from the light incident surface 26A (26B) is restrained. Accordingly, when the light incident surface 26A (26B) is formed into a protruding curved surface like the present embodiment, it is possible to restrain the scatter of the light before the light reaches the light exit surface 27 through the light guiding member 23, and eventually to restrain an illuminance decrease of the map lamp due to the scatter.

Note that, as described above, the map lamp of the overhead console 10 emits light in a direction opposite to a direction where the occupant is positioned, when viewed from the light exit surface 27, and therefore, depending on its surrounding brightness, it might be difficult to check whether the map lamp is turned on or off. In this regard, in the present embodiment, since the light exit surface 27 is constituted by the flat portion 41 and the cut face portion 42 as described above, it is easy to check whether the map lamp is turned on or off.

Figure 14:
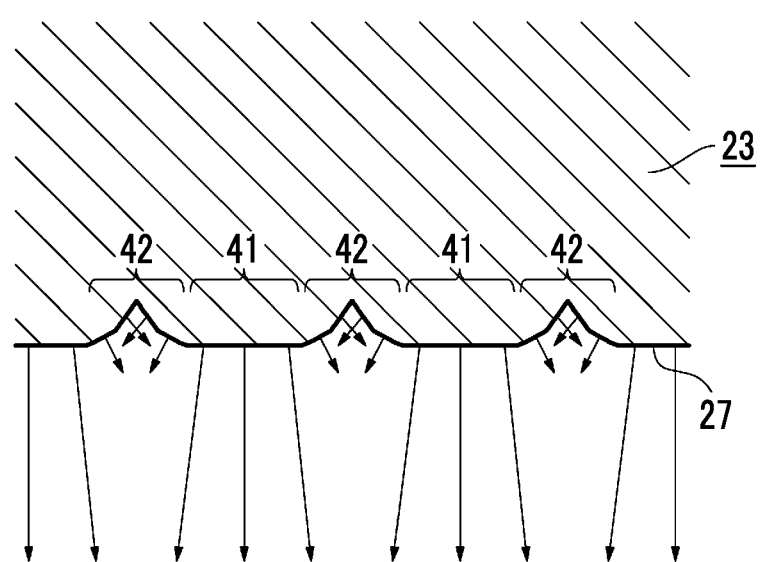
FIG. 14 is a view illustrating a light emission mode from a light exit surface of the light guiding member.

FIG. 14 illustrates an emission mode of light from the light exit surface 27 in the overhead console 10. Light is emitted from the cut face portion 42 constituted by a surface inclined to the flat portion 41, in a direction different from the light emission direction from the flat portion 41. Accordingly, on such a light exit surface 27, while the light is emitted within an irradiation range of the map lamp through the flat portion 41, the light can be emitted in directions other than the irradiation range of the map lamp through the cut face portion 42, thereby making it possible to easily check whether the map lamp is turned on or not.

An area ratio between the flat portion 41 and the cut face portion 42 on such a light exit surface 27 is adjusted so that illuminance of an irradiation part of the map lamp is secured sufficiently. Further, a shape, an arrangement, a size, and an angle of each surface that constitutes the flat portion 41 or the cut face portion 42 are set so that the light exit surface 27 shines brightly at the time when the map lamp is turned on.

Figure 15A:
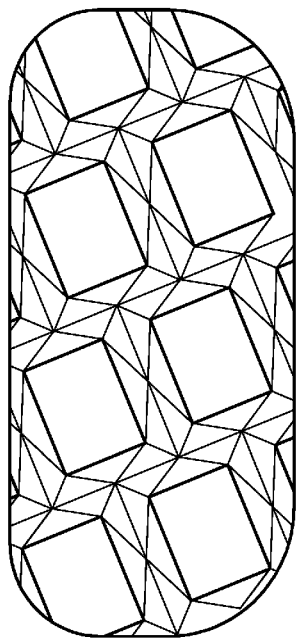
FIG. 15A is a plan view of a light exit surface in a modification of the overhead console that is changed in a surface configuration of the light exit surface of the light guiding member.
Figure 15B:
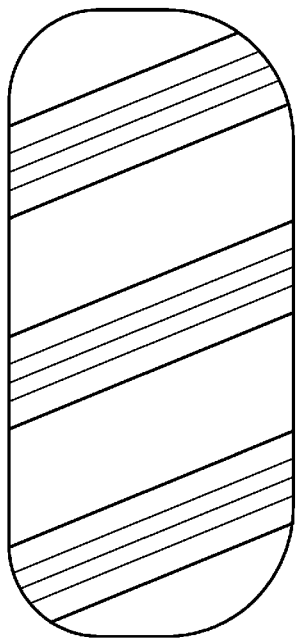
FIG. 15B is a plan view of a light exit surface in a modification of the overhead console that is changed in a surface configuration of the light exit surface of the light guiding member.
Figure 15C:
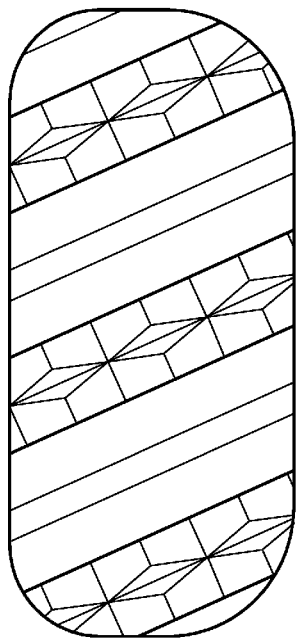
FIG. 15C is a plan view of a light exit surface in a modification of the overhead console that is changed in a surface configuration of the light exit surface of the light guiding member.
Figure 15D:
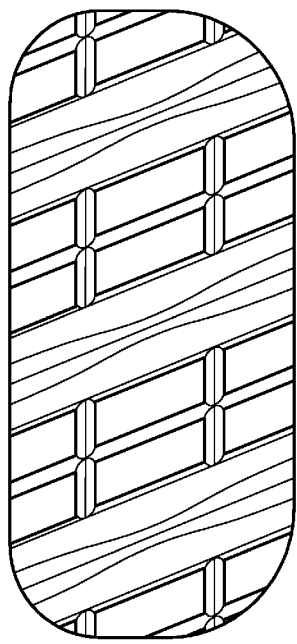
FIG. 15D is a plan view of a light exit surface in a modification of the overhead console that is changed in a surface configuration of the light exit surface of the light guiding member.
Figure 15E:
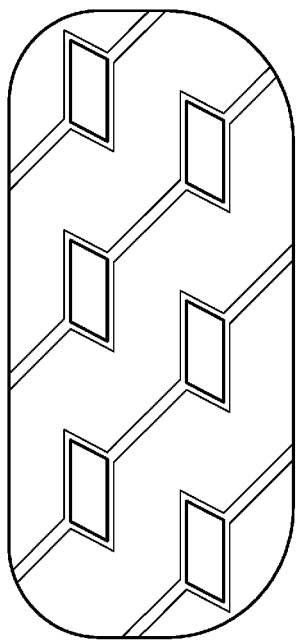
FIG. 15E is a plan view of a light exit surface in a modification of the overhead console that is changed in a surface configuration of the light exit surface of the light guiding member.
Figure 15F:
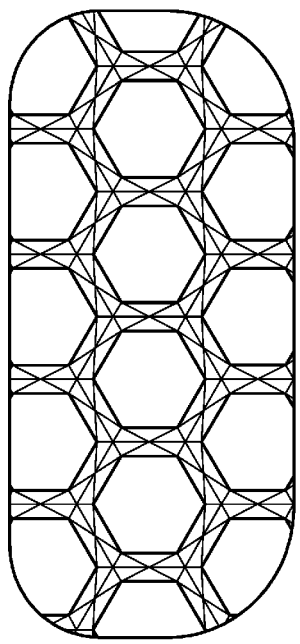
FIG. 15F is a plan view of a light exit surface in a modification of the overhead console that is changed in a surface configuration of the light exit surface of the light guiding member.
Figure 16:
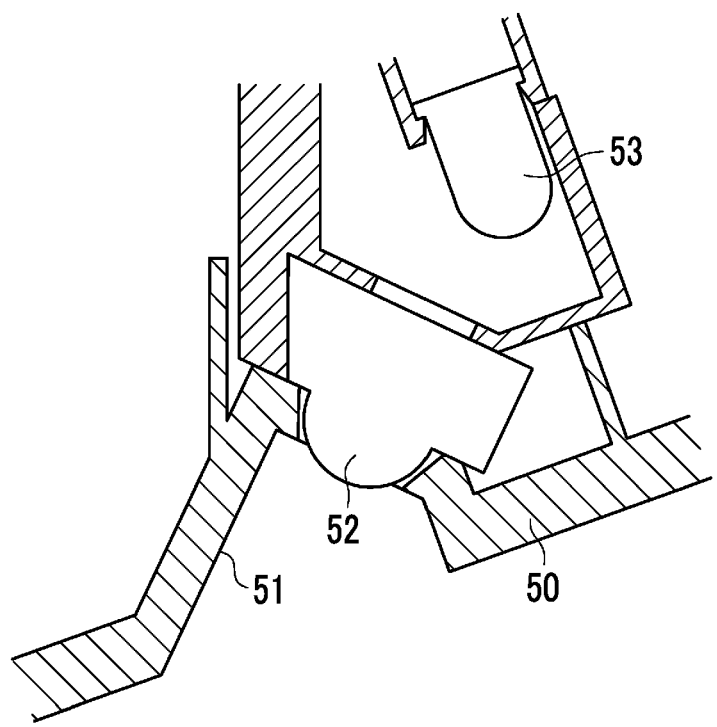
FIG. 16 is a sectional view of a part around a map lamp in a conventional overhead console.

The foregoing embodiments may also be carried out by adding changes as stated below. A surface configuration of the flat portion 41 and the cut face portion 42 in the light exit surface 27 may be changed appropriately. FIGS. 15A to 15F illustrate modifications of the surface configuration of such a light exit surface. A light exit surface of the modification of FIG. 15A includes a flat portion constituted by a rectangular surface. A light exit surface of the modification of FIG. 15B is configured such that a flat portion and a part provided with a cut face portion are formed in a stripe pattern, and a light exit surface of the modification of FIG. 15C is configured such that a part provided with a flat portion is formed in a stripe pattern. Further, light exit surfaces of the modifications of FIGS. 15D and 15E have different arrangements, but include a flat portion constituted by a parallelogram surface. Furthermore, a light exit surface of the modification of FIG. 15F is configured such that a flat portion does not include a triangular surface, but is constituted only by a hexagonal surface.

The entire light exit surface 27 may be constituted by a flat surface. Incidentally, it is also possible to constitute the entire light exit surface 27 by a protruding curved surface or a recess curved surface other than the flat surface, and in such a case, an irradiation range, an illuminance distribution, and the like of the light from the light exit surface 27 can be adjusted by a curvature of the surface.

The first light guiding portion 29 and the second light guiding portion 30 may be provided so as to be separated from respective parts connected to the light exit surface 27. The number of light sources to be provided for the single light exit surface 27 may be one, or three or more. In such a case, the number of light incident surfaces and light guiding portions having a bending portion, to be provided in the light guiding member, is the same number as the number of light sources.

The number of bending portions of the light guiding member 23 may be one, or three or more. The light incident surface 26A, 26B may be formed into a flat surface or a recess curved surface. Even in such a case, if the light source 22A, 22B emits light with a high directivity from the light-emitting surface 25A, 25B, the scatter of the light in the light guiding member 23 before the light reaches the light exit surface 27 can be kept to such an extent that the illuminance does not decrease.

If the unevenness in the luminance of the light exit surface 27 due to the leak light from the light source 22A, 22B does not cause any problem, the partition wall 33 may be omitted. Further, similarly, if the unevenness in the luminance of the light exit surface 27 does not cause any problem, a positional relationship of the light exit surface 27 with respect to the back rest 18 of the front seat 17 may be set to a positional relationship different from the above embodiment.

In the above embodiment, the light guiding member 23 is made of a transparent resin material, but the light guiding member 23 may be made of a material other than the resin, such as glass, provided that the material is a transparent material that passes light therethrough while scattering the light moderately.

A light source other than the surface-mounting light-emitting diode, such as a bullet-type light-emitting diode or a lamp bulb, may be employed as the light source 22A, 22B.

What is claimed is:

1. An overhead console assembled to a ceiling part of a passenger compartment, the overhead console comprising:
 a light source provided inside the overhead console; and
 a light guiding member including a light incident surface opposed to a light-emitting surface of the light source, and a light exit surface exposed outside the overhead console, the light guiding member also including bending portions at intermediate positions in the light guiding member such that the light guiding member extends from the light incident surface to the light exit surface so as to form, inside the light guiding member, an optical path in which light incident on the light incident surface is reflected by reflecting surfaces provided in the bending portions so as to reach the light exit surface, and the light guiding member having such a shape that line segments drawn from given points on the light incident surface to given points on the light exit surface do not include a line segment that passes through only the light guiding member,
 wherein the light exit surface consists of a plurality of flat portions each separated by cut face portions, with all of the plurality of flat portions having a flat portion consisting of a flat surface perpendicular to a front-face direction of the light exit surface, wherein the cut face portions each consist of a cut face flat surface inclined to the flat portion flat surface of the plurality of flat portions so as to divide the plurality of flat portions into a plurality of regions.

2. The overhead console according to claim 1, wherein a partition wall made of an opaque material is provided inside the overhead console so as to intersect with all line segments that do not pass through the light incident surface among the line segments drawn from the given points on the light-emitting surface to the given points on the light exit surface.

3. The overhead console according to claim 1, wherein the light incident surface is a protruding curved surface.

4. The overhead console according to claim 1, wherein:
a plurality of light sources are provided for a single light exit surface; and
the light guiding member is configured such that each of the plurality of light sources is individually provided with the light incident surface.

5. The overhead console according to claim 1, wherein the plurality of flat portions and the cut face portions of the light exit surface make up a front face of the light exit surface that interfaces with an outside of the overhead console.

6. The overhead console according to claim 1, wherein each of the plurality of flat portions has a polygonal shape.

7. A vehicle-body upper structure constituting a roof portion of a vehicle body, the vehicle-body upper structure comprising
an overhead console including a light source provided inside the overhead console and assembled to a ceiling part of a passenger compartment, wherein:
the overhead console includes a light guiding member including a light incident surface opposed to a light-emitting surface of the light source, and a light exit surface exposed outside the overhead console, the light guiding member also including bending portions at intermediate positions in the light guiding member such that the light guiding member extends from the light incident surface to the light exit surface so as to form an optical path in which light incident on the light incident surface is reflected by reflecting surfaces provided in the bending portions so as to reach the light exit surface, and the light guiding member having such a shape that line segments drawn from given points on the light incident surface to given points on the light exit surface do not include a line segment that passes through only the light guiding member;
the light exit surface consists of a plurality of flat portions each separated by cut face portions, with all of the plurality of flat portions having a flat portion consisting of a flat surface perpendicular to a front-face direction of the light exit surface, wherein the cut face portions each consist of a cut face flat surface inclined to the flat portion flat surface of the plurality of flat portions so as to divide the flat portion into a plurality of regions;
the light exit surface is positioned on a vehicle-body front side relative to a position of a back rest of a front seat of a vehicle; and
the light source is positioned further from the vehicle-body front side than the light exit surface.

* * * * *